United States Patent [19]

Smith, III et al.

[11] Patent Number: 4,504,062

[45] Date of Patent: Mar. 12, 1985

[54] DIGITAL WATCH HAVING MATRIX DISPLAY FOR ARCADE-LIKE GAME PLAYING

[75] Inventors: Jay Smith, III, Pacific Palisades; Gerald S. Karr, Venice, both of Calif.

[73] Assignee: Smith Engineering, Culver City, Calif.

[21] Appl. No.: 270,314

[22] Filed: Jun. 4, 1981

[51] Int. Cl.³ .............................................. A63F 9/00
[52] U.S. Cl. ................................ 273/313; 273/85 G; 368/10
[58] Field of Search ............... 273/138 A, 237, 85 G, 273/313, 316; 368/10

[56] References Cited

U.S. PATENT DOCUMENTS

| | | | |
|---|---|---|---|
| 3,888,491 | 6/1975 | Bernard et al. | 273/237 |
| 4,114,890 | 9/1978 | Yamamoto et al. | 273/237 |
| 4,188,779 | 2/1980 | Fatton | 273/138 A |
| 4,244,635 | 1/1981 | Sasaki et al. | 273/237 |
| 4,279,421 | 7/1981 | Tepoorten et al. | 273/237 |
| 4,438,926 | 3/1984 | Yokoi et al. | 273/138 A |

FOREIGN PATENT DOCUMENTS

| | | | |
|---|---|---|---|
| 53-79636 | 7/1978 | Japan | 434/128 |
| 0014840 | 6/1979 | Japan | 273/138 A |

Primary Examiner—Richard C. Pinkham
Assistant Examiner—Leo P. Picard
Attorney, Agent, or Firm—Jackson, Jones & Price

[57] ABSTRACT

A digital electronic watch having a matrix game display comprising a plurality of game display element arranged in a matrix on the display, each having at least two game display element segments and with selective illumination of game display element segments, to simulate movement about the matrix of game play units and interaction between game play units, in response to a stored program with the stored program also including instructions performed in response to player input during the game, and including sound effect generation during the game.

1 Claim, 17 Drawing Figures

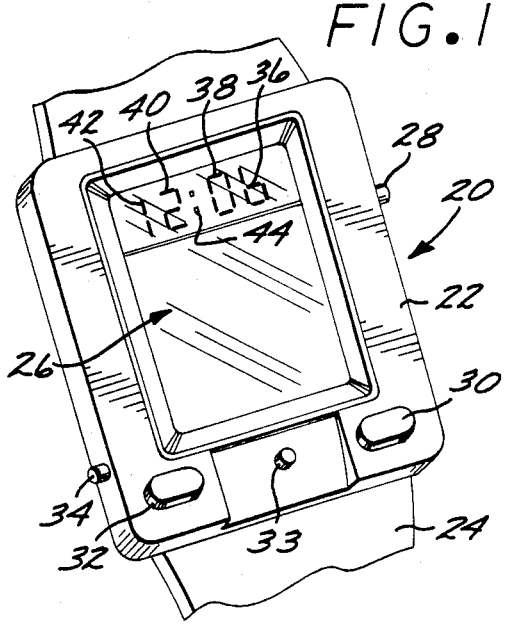
FIG.1
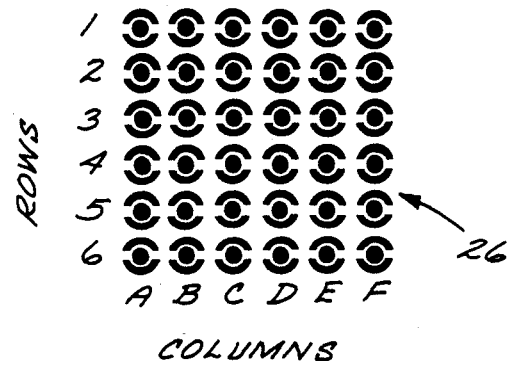
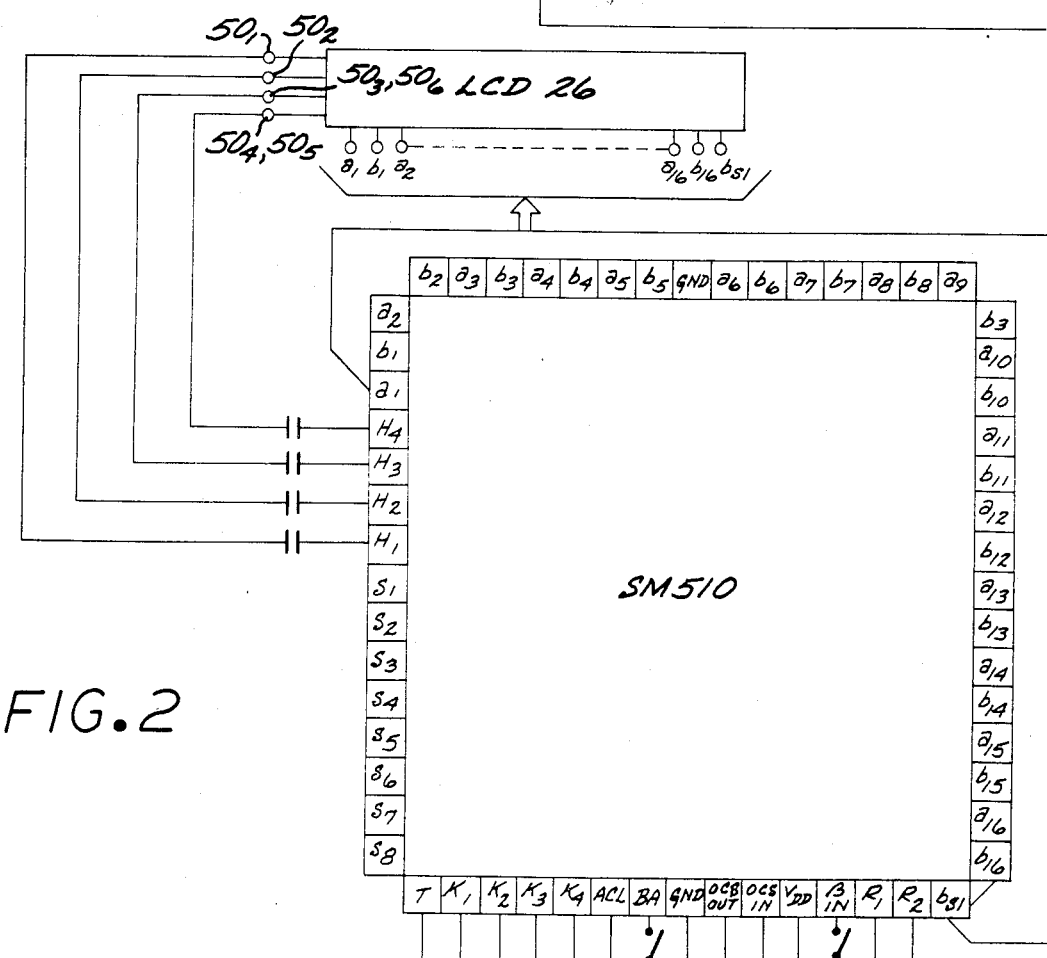
FIG.2
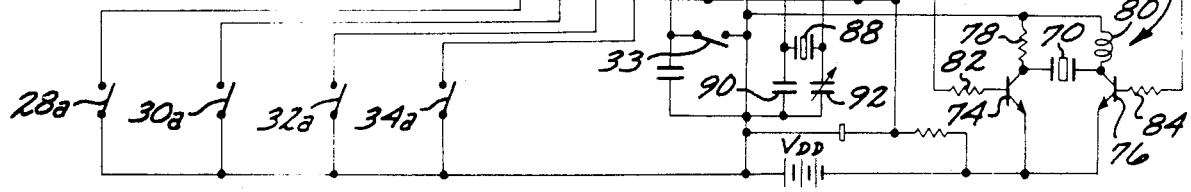

DIGITAL WATCH HAVING MATRIX DISPLAY FOR ARCADE-LIKE GAME PLAYING

FIELD OF THE INVENTION

The present invention relates to electronic games.

BACKGROUND AND SUMMARY OF THE INVENTION

The present invention relates to a novel digital watch having on the watch face a game display consisting of a matrix of game display elements which are selectively illuminated in response to a stored program contained on a microcomputer (microprocessor) LSI chip contained in the watch housing. In the past digital watch displays have been limited to displaying alphanumeric information such as time, A.M. or P.M., date, etc. One watch which is believed to be on the market made by Tomy called the "Watchman", has a rudimentary game display of limited capability which displays a bowling game, wherein the game player can position a simulated bowler in one of a plurality of positions on an LCD display and then cause release of a bowling ball which moves across the LCD display in a line from the point of release to intersect and knock down one or more of a plurality of bowling pins at the opposite side of the LCD display.

This "Watchman" game watch is only capable of playing a single game and the capability of the display is much less versatile than that of a matrix display according to the present invention for displaying a wide variety of different games on the same game display. In addition, the "Watchman" game watch has much less variety in the type and amount of player input during the play of the game, and in particular, neither enables nor requires the game player to repeatedly generate player input during the course of the game in response to a continuously varying game display which continuously increments through display changes in response to the game program and interaction of program controlled display and the changes and player input controlled display changes. The present invention relates to a such a matrix game display incorporated on the face of a digital watch display, which watch has a programed microcomputer (microprocessor) for controlling the display of a plurality of games on the matrix display and the capacity for incorporating a plurality of different player inputs into the conduct of the game.

The game displaying wristwatch of the presently preferred embodiment of the present invention provides the versatility of multiple selection and multiple available player inputs, all on a wristwatch having a display for displaying time or the play of the game, by providing an LSI microcomputer (microprocessor) chip controlled display with a programmed control of the game display and the player input into the control of the game. The game display is in the form of a matrix having a plurality of game display elements arranged in rows and columns, each with the capability of being displayed in a plurality of different game element representations, thereby enabling the simulation of the movement and the interactions about the matrix "screen" of the display, in response to the programmed game control as affected by the player input to the game control.

Examples of the move important features of the present invention have thus been summarized rather broadly in order that the detailed description which follows may be better understood and the contribution to the art may be appreciated. There are, of course, additional features of the invention that will be described hereinafter and which will also form the subject of the appended claims. These other features will become apparent with reference to the following detailed description of the preferred embodiment of the invention in connection with the accompanying drawings, wherein like reference numerals have been used to indicate the same elements, in which:

BRIEF DESCRIPTION OF THE DRAWING

FIG. 1 depicts a prespective view of the game displaying wristwatch of the present invention indicating the game display and the various buttons for the game selection, player input and normal time-setting functions;

FIG. 2 is a schematic partially block diagram of the microcomputer employed in the presently preferred embodiment showing the external circuitry for driving the fame display, generating sound effects and providing player input;

FIG. 3 illustrates the display of the watch of the present invention with all displayable segments on the display illuminated, both game display segments and digital display segments;

DETAILED DESCRIPTION OF A PREFERRED EMBODIMENT

Figure 5:
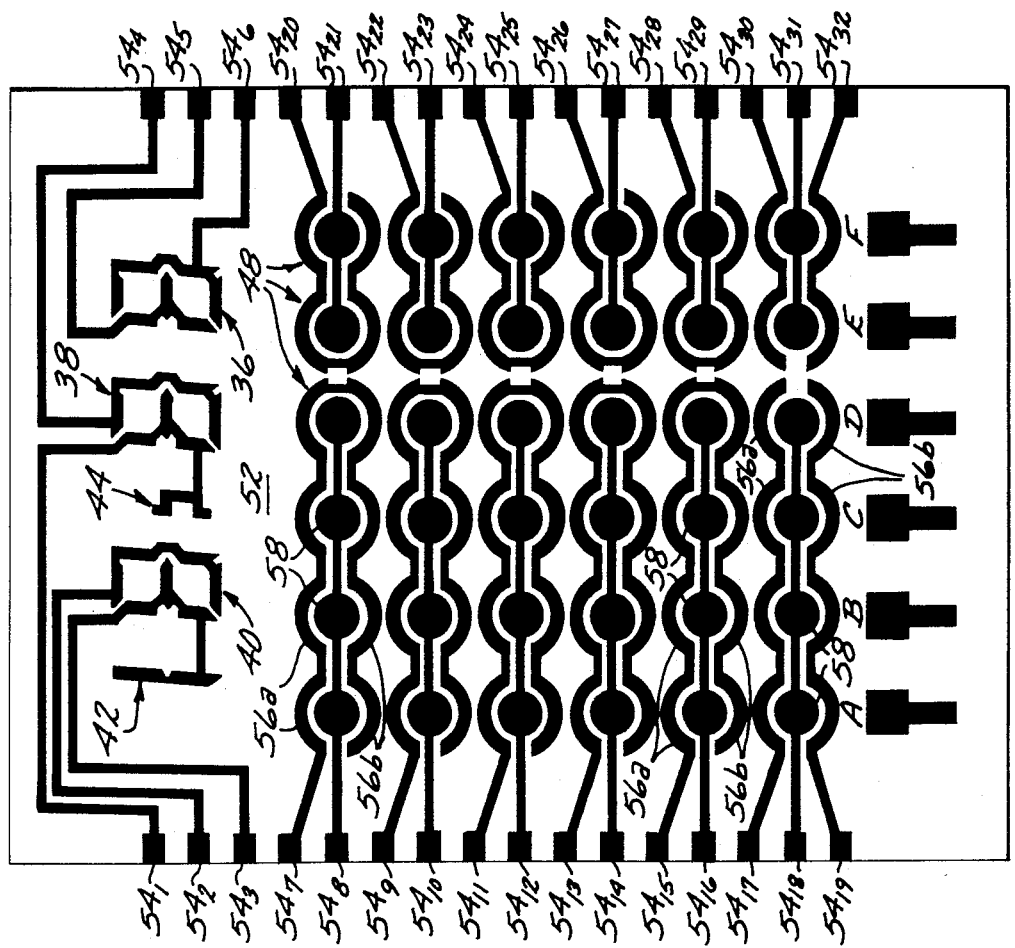
FIG. 5 shows the front plate electrical contracts and interconnections of the LCD front plate for the game display and digital display segments.

The watch 20 of the present invention is shown in a perspective view in FIG. 1. It has a watch housing 22 which is held on the wrist of the wearer by a watch band 24. The watch 20 has a watch face 26 formed by an LCD, as described more fully below, and having the time displayed digitally in the upper portion of the face 26. The portion of the face 26 below the digital time display is available for display of the various games playable on the watch face 26, as described in more detail below. The watch 20 has a mode select button 28, which is depressed to place the watch 20 in a condition to set the time as displayed on the digital display, or to select one of the several games playable on the watch. When the mode select switch button 28 is depressed so as to enable setting the digital time display, the wearer of the watch then depresses one of the Right or Left buttons, 30, 32 on the watch housing 22 to increment, respectively, the minutes from 0 through 99 sequentially, and the hours from 0 through 19 sequentially, in order to set the proper hours and minutes on the digital watch display on the face 26. During game play, the Right and Left buttons 30, 32 provide player input into the microcomputer depending upon the selected game, as described more fully below. A fourth button 34 in the watch housing 22, demoninated herein for identification as the "Fire" button, provides a means for a third player input to the microcomputer during game play, which can be utilized as described below regarding an embodiment of the present invention.

In an embodiment of the present invention, the display on the wristwatch face 26 is driven by, e.g., a Sharp SM-510 microcomputer to control the display of the various games in response to a stored program for the game and the player input to the SM-510. The Sharp SM-510, of course, is exemplary of microcomputers and microprocessors suitable for application in the present invention, because of its low power dissipation in the driving of the display LCD. An LCD display was also chosen for low power dissipation, however, other displays may also be useful, e.g., electrochromatic or electrophoretic displays. The SM-510 is a single chip CMOS microcomputer having 4-bit parallel processing functions, 2772 bytes (8 bits each) of ROM, 128 words (4 bits each) of RAM, a 15 stage divider and a 32 segment liquid crystal driver circuit. The SM-510 ROM is divided into 44 pages (0-43) with 63 steps per page and each step being an 8-bit byte in length.

The SM-510 has the capability of employing 49 instruction sets, with nesting of 2 levels of subroutines. There are two types of inputs ports, 4-bit syncronous input ports $K_1$-$K_4$ and two 2-bit asyncronous input ports B and BA. The SM-510 has thirty-three bits of segment output $a_1$-$a_{16}$, $b_1$-$b_{16}$, and $b_{s1}$, eight bits of strobe output $S_1$-$S_8$, four bits of backplate output $H_1$-$H_4$, and two bits of independent output $R_1$ and $R_2$.

The SM-510 employs an internal 15-stage divider with reset, and a quartz crystal clock oscillator having a 32.768 KHz clock osillation, a one-quarter duty cycle display (LCD) driver circuit and a single −3 V power supply. The flat pin package of the SM-510 is illustrated, in the sales brochure of Sharp Corporation entitled SM-510 CMOS 4-bit Single-Chip Microcomputer, submitted along with this application and incorporated herein by reference.

The SM-510 and the external circuitry according to the present invention are shown in FIG. 2.

The face 26 of the wrist watch 20 comprises a liquid crystal diode (LCD), as shown in FIG. 1, having at the upper portion thereof three and one-half digits of display and a colon separating the three and one-half digits with two full digits of display to the right of the colon and one and one-half digits of display to the left of the colon. The one half digit display is for representation either of a one when eliminated or a zero, i.e., not illuminated. The three and one-half digits thus are capable displaying hours and minutes of time as is typical in a digital watch display. The three and one-half digits 36, 38, 40 and 42 of display are also used for displaying scoring and other information during the course one of the plurality of games to be played on the watch face 26 display. The maximum number displayable in the three and one-half digits 36, 38, 40 and 42 is 1999, however, only the three full digits 36, 38 and 40, i.e., up to 999, are used in game play.

Below the three and one-half digits 36, 38, 40 and 42 are arranged on the LCD face 26 of the watch 20 a plurality of rows and columns of game display elements 48, with the preferred embodiment having six rows, 1-6, and six columns, A-F, as shown in FIG. 3, which are selectively illuminated by a four bit multiplexing output of the microcomputer (microprocessor) contained on the SM-510 chip contained within the watch housing 22.

Figure 4:
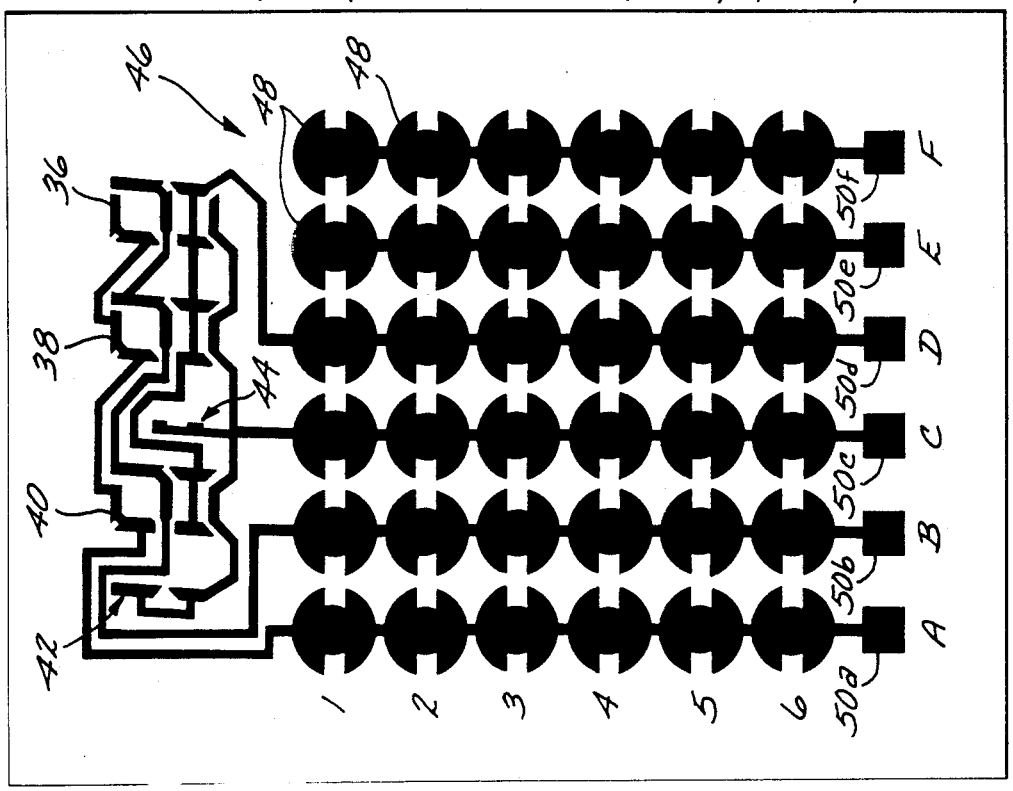
FIG. 4 shows the LCD backplanes for the segments shown in FIG. 3, and the electrical interconnection thereof, for the LCDd type display of the preferred embodiment.

The LCD 26 consists of a back plane essentially as shown in FIG. 4 having the back planes for the plurality of the game display elements 48 electrically connected to contacts $50_1$-$50_6$ by column. Also the back plane electrically connects each of the columns to selected segmental portions of the back planes of the three and one-half display digits 36, 38, 40 and 42 and the colon 44, for multiplexing the digital display, in accordance with well known digital watch or digital calculator display multiplexing techniques employing four bit mutiplexing. The back planes of columns C and F are electrically connected to the same multiplexing output, e.g., $H_3$ of the microcomputer and columns D and E are electrically connected to the same multiplexing output, e.g., $H_4$, of the microcomputer SM-510. Thus the six columns can be driven by the microcomputer which is capable of four bit multiplexing.

The front plate 52 of the LCD 26, as is shown generally in FIG. 5, has 32 segment input contacts $54_1$-$54_{32}$. Six of the segment input contacts $54_1$-$54_6$ are electrically connected to portions of the three and one-half display digits 36, 38, 40, 42 and the colon 44 for multiplexing the display digits as is well known in the art. As can be seen from FIG. 5, for rows 1-5, the outer game display segments 56, both upper and lower ($56_a$ and $56_b$), in columns A-D, are connected respectively, to $54_7$, $54_9$, $54_{11}$, $54_{13}$ and $54_{15}$. All of the inner game display segments 58 in rows 1-5, columns A-D are also connected to a single electrical connector, respectively $54_8$, $54_{10}$, $54_{12}$, $54_{14}$ and $54_{16}$. In columns E and F separate input contacts are also used for each of the rows 1 thru 5 for electrical contact to the inner 58 and outer 56, game display segments in each column and row, respectively, $54_{21}$, $54_{23}$, $54_{25}$, $54_{27}$ and $54_{29}$ for the inner 58 and $54_{20}$, $54_{22}$, $54_{24}$, $54_{26}$ and $54_{28}$ for the outer 56. Thru the use of the four-bit multiplexing, and with the back planes of columns D and F and columns E and D electrically connected to the same microcomputer output, the display on the face 26 is capable of illuminating either or both of the inner and outer game display segments in any given row and column 1-5 and A-F. In row 6, separate inner contacts $54_{17}$, and $54_{19}$ are employed for, respectively, the upper outer game display segments $56_a$ and lower outer game display segments $56_b$ for columns A thru D, and a separate input contact $54_{18}$ is employed for the inner game display element segments 58. The upper outer game display segments $56_a$, lower outer game display segments $56_b$ and inner game segments 58 in columns E and F are similarily connected to separate input contacts (respectively, $54_{30}$, $54_{32}$ and $54_{31}$). Thus the game display elements 48 in row 6, thru four-bit multiplexing, can be displayed with any combination of the upper outer game display segment $56_a$, lower outer game display segment $56_b$ or inner game display segment 58 illuminated independent of the illumination of any other segments of the game display elements 48 in row 6, columns A thru F.

Within the chip of the SM-510, the strobe output ports $S_1$-$S_8$ are connected respectively to the eight stages of an 8-bit shift register W, as shown in the block diagram of the chip in the above referenced Sharp Brochure. These along with the input ports $K_1$ thru $K_4$ on the Sharp SM-510 give the SM-510 the capacity for a 32 key input matrix. However, for the game watch 20 of the present invention, only inputs $K_1$ thru $K_4$ are needed and used. $K_1$ thru $K_4$ are electrically connected, respectively, to one of the input buttons 28, 30, 32 and 34 on the watch housing 22, which when depressed close the respective switch $28_a$, $30_a$, $32_a$ or $34_a$ shown in FIG. 2. Each of the input ports $K_1$-$K_4$ are also electrically connected to one stage of a four-bit register K shown in the above noted block diagram of the SM-510. By execution of proper instructions by the microcomputer of the SM-510, the contents of register K can be loaded into an accumulator $A_{cc}$ in the SM-510 to provide player input during the game play and to set the digital time display as noted above.

The segment output ports $a_1$-$a_{16}$, $b_1$-$b_{16}$ on the microcomputer chip are connected within the chip to the display RAM as shown in the above noted block diagram in the Sharp Brochure. By transferring the appropriate data to the display RAM locations corresponding to the segment output ports $a_1$-$a_{16}$ and $b_1$-$b_{16}$ at the appropriate times according to the program of the SM-510, multiplexing of the LCD 26 is achieved as is well known in the art. The SM-510 program is set up for the segment output ports $a_1$-$a_{16}$ and $b_1$-$b_{16}$ to drive the LCD display through segment input contacts $54_1$-$54_{32}$ with a one-quarter duty cycle. The SM-510 segment output contact $b_{s1}$ performs an interrupt function when enabled and causes the display to blink.

The back plate output ports $H_1$-$H_4$ are connected, as shown in FIG. 3 and in the above noted block diagram, to the back plate input contacts $50_1$-$50_6$ as discussed above.

The SM-510 has two output ports, $R_1$ and $R_2$, for a buzzer output and is capable of directly driving a piezoelectric buzzer 70 through the buzzer circuit 72 shown in FIG. 3. The buzzer 70 is connected across the collectors of a pair of NPN transistors 74, 76 with a parallel RL network consisting of a resistor 78 and an inductor 80 between the buzzer 70 and system ground GND. The emitters of the transistors 74, 76 are connected to voltage source $-V_{DD}$ and the bases of the transistors 74, 76 are, respectively, connected to outputs $R_1$ and $R_2$ of the SM-510 through resistors 82, 84. When the $R_1$ and $R_2$ outputs are set by the SM-510, a pulse output of, e.g., 4.096 KHz (from the 32.768 KHz quartz crystal oscillator of the SM-510), is placed on each of the outputs $R_1$, $R_2$, with a 180° phase shift between $R_1$ and $R_2$. This results in a high volume output of the buzzer 70. Enabling only the output of one of the $R_1$, $R_2$ outputs for output of the 4.096 KHz output pulse wave on, e.g., $R_1$, results in a low volume ouput of the buzzer 70. The SM-510 is also capable of modulating the outputs on $R_1$ and $R_2$ to produce varying tones and sound effects through the buzzer 70, which are employed in the wristwatch 20 of the present invention. The buzzer 70 driving circuit 72 shown in FIG. 3 prevents system errors within SM-510 due to the possibility of kickback voltage from the buzzer 70.

The outputs $R_1$ and $R_2$ are connected to the accumulator $A_{cc}$ of the SM-510 with the low order 2-bits of the accumulator output through enabling AND gates R as shown in the above noted Sharp Brochure. The other inputs of the AND gates R are the 4.096 KHz signal used to drive the buzzer 70 through outputs $R_1$ and $R_2$.

As shown in the block diagram in the above noted Sharp Brochure the SM-510 has an accumulator $A_{cc}$ which is a 4-bit register through which data and stored information are transferred within the SM-510. The accumulator $A_{cc}$ is connected electrically to an arithmetic logic unit (ALU), a carry flip-flop and the RAM of the SM-510. The accumulator is used, e.g., to transfer information stored in the ROM, to transfer to and from the RAM, and to transfer to and from the SM-510 input and output ports. A program counter in the SM-510 consists of a 2-bit $P_u$ register, a 4-bit $P_M$ register and a 6-bit $P_L$ polynomial counter. $P_u$ and $P_m$ designate the ROM page and $P_L$ designates the step on the page ($P_L$=111111 is an inhibited state). Table I shows the ROM configuration.

TABLE I

|  |  | $P_u$ |  |  |  |
|---|---|---|---|---|---|
|  |  | 00 | 01 | 10 | 11 |
| $P_M$ | 0000 | 0 | 1 | 2 | 3 |
|  | 0001 | 4 | 5 | 6 | 7 |
|  | 0010 | 8 | 9 | 10 | 11 |
|  | 0011 | 12 | 13 | 14 | 15 |
|  | 0100 | 16 | 17 | 18 | 19 |
|  | 0101 | 20 | 21 | 22 | 23 |
|  | 0110 | 24 | 25 | 26 | 27 |
|  | 0111 | 28 | 29 | 30 | 31 |
|  | 1000 | 32 | 33 | 34 | 35 |
|  | 1001 | 36 | 37 | 38 | 39 |
|  | 1010 | 40 | 41 | 42 | 43 |

When power is switched on, the system starts execution from the address $P_u$, $P_M$, $P_L$=3, 7, 0 which is determined by the SM-510 internal ACL circuit. If the ACL port becomes "high", i.e., =+$V_{DD}$ (GND) the program counter returns to step 0 of page 31 of the ROM (i.e., $P_u$=3, $P_M$=7, $P_L$=0. When the system is started due to a 1S signal or a key input, i.e., from $K_1$-$K_4$, signal, the start address is $P_u$, $P_m$, $P_L$=1, 0, 0. The SM-510 has jump instructions noted below which allow the program counter to jump into any page or any subroutine in the ROM. TM is an indexed jump instruction with the index page always set to be page 0. A stack is constructed from the $S_u$, SM, SL, Ru, RM and RL registers with a maximum nesting level of 2. For other than jump instructions, polynomial counter $P_L$ is incremented by steps of 1 according to the polynomial code.

The RAM of the SM-510 is an 8×16×4-bit RAM with $B_L$ from 0000 to 1111 and $B_M$ from 000 to 111, respectively, designating X, Y, Z, M, P, Q, R and S RAM registers, giving the coordinates of each 4-bit RAM word address. The last two RAM registers R and S are designated as the display RAM and the word addresses therein are respectively connected to a designated one of the segment outputs $a_1$-$a_{16}$ and $b_1$-$b_{16}$ to drive the LCD 26 display in conjunction with outputs on $H_1$-$H_4$. The data from each of the R and S registers is output to the respective segment outputs $a_1$-$a_{16}$ and $b_1$-$b_{16}$ in wave form. The display RAM in all other respects functions as the remainder of the RAM. The SM-510 by transfer of data to the display RAM registers R and S, drives the LCD 26 with a one-quarter duty cycle, in conjunction with the outputs on $H_1$-$H_4$ and a one-third bias for automatic multiplexed display of the LCD 26.

The SM-510 has a built in clock oscillator which oscillates at 32.768 KHz. For convenience of illustration, the oscillator circuit 86 having a quartz crystal oscillator 88 is shown in FIG. 3 as externally connected to SM-510 pins $OSC_{out}$ and $OSC_{in}$ and connected to $+V_{DD}$, i.e., system ground, through a capacitor 90 and a variable capacitor 92.

The SM-510 has a 15 stage settable divider DIV(15) as shown in the above noted block diagram in the Sharp Brochure, all stages of which are resetable by the IDIV instruction. The output of the last bit of the divider is at 1 Hz (with a 32.768 KHz clock oscillator) and can be tested by the TIS instruction.

The electrical specifications and characteristics of the SM-510 are set forth in the above noted Sharp Brochure.

Table II shows the mnemonics and 8-bit operational code for the RAM addressing instructions for the SM-510 with a brief explanation of the operation performed.

TABLE II

| MNEMONIC | OPCODE $I_8 I_7 I_6 I_5 I_4 I_3 I_2 I_1$ | OPERATION |
|---|---|---|
| LBxy | 0 1 0 0 $I_4 I_3 I_2 I_1$ | Address a specific (xy) column and register in the RAM |
| LBLxy | 0 1 0 1 1 1 1 1<br>$I_8 I_7 I_6 I_5 I_4 I_3 I_2 I_1$ | Address a column and register within the RAM |
| SBM | 0 0 0 0 0 0 1 0 | Set $B_M3=1$ during the next step |
| EXBLA | 0 0 0 0 1 0 1 1 | Exchange the contents of $A_{cc}$ and $B_L$ |
| INCB | 0 1 1 0 0 1 0 0 | Count up $B_L$ and ship the next instruction if $B_L=F$ (hexadecimal 15) |
| DECB | 0 1 1 0 1 1 0 0 | Count down $B_L$ and ship the next instruction if $B_L = 0$ |

Table III shows the ROM addressing instructions and the mnemonics and opcodes, along with the corresponding steps carried out in the SM-510.

TABLE III

| MNEMONIC | OPCODE $I_8 I_7 I_6 I_5 I_4 I_3 I_2 I_1$ | OPERATION |
|---|---|---|
| ATPL | 0 0 0 0 0 0 1 1 | Transfer the contents of the low-order 4-bits of $A_{cc}$ to the low-order 4-bits of $P_L$. $P_{15}$ and $P_{16}$ remain unchanged. |
| RTN0 | 0 1 1 0 1 1 1 0 | Return from $S_u$broutine |
| RTNI | 0 1 1 0 1 1 1 1 | Return from $S_u$broutine and skip the next instruction |
| TLxyz | 0 1 1 1 $I_4 I_3 I_2 I_1$<br>$I_8 I_7 I_6 I_5 I_4 I_3 I_2 I_1$ | Jump (two byte instruction) |
| TMLxyz | 0 1 1 1 1 1 $I_2 I_1$<br>$I_8 I_7 I_6 I_5 I_4 I_3 I_2 I_1$ | $S_u$broutine Jump (two byte instruction) |
| TMxyz | 1 1 $I_6 I_5 I_4 I_3 I_2 I_1$<br>$I_8 I_7 I_6 I_5 I_4 I_3 I_2 I_1$ | $S_u$broutine Jump (two byte instruction) |
| T x | 1 0 $I_6 I_5 I_4 I_3 I_2 I_1$ | Jump |

A ROM address jump is performed by a one step instruction T for a jump within the same ROM page and a two step instruction TL to jump outside of a page. $I_4$-$I_1$ of the first byte gives PM, $I_8$-$I_5$ and $I_4$-$I_1$ of the second byte give, respectively $P_u$ and $P_L$. There are two subroutine jump instructions, one for jumping into a subroutine on a page solely for subroutines, 16, 17, 18 and 19, by a two step instruction TM of two bytes, for any subroutine at any page location in the RAM. This instruction is indexed from page 0, step 0. It is also possible to jump to any subroutine stored in the ROM in any page from 0-16 by the two byte instruction TML wherein the $I_2$ and $I_1$ of the first instruction byte give the most significant bits of the $P_M$ (0000-0011), $I_8$ and $I_7$ of the second instruction gives $P_u$ (00-11) and $I_6$-$I_1$ of the second instruction byte give the step in the page (000000-111111).

Table IV shows the mnemonics and operating codes for the data transfer and input/output instructions of the SM-510, with a brief explanation of the operation performed.

TABLE IV

| MNEMONIC | Opcode $I_8 I_7 I_6 I_5 I_4 I_3 I_2 I_1$ | OPERATION |
|---|---|---|
| EXCx | 0 0 0 1 0 0 $I_2 I_1$ | Exchange the contents of $A_{cc}$ and RAM, and modify the contents of $B_{M2}$, 1 by exclusive OR between $B_{M2}$, 1 and variable x ($I_2 I_1$) |
| EXCIx | 0 0 0 1 0 1 $I_2 I_1$ | Exchange the contents of $A_{cc}$ and RAM and modify the contents of $B_{M2}$, 1 as in EXC x and count up $B_L$, skip the next instruction if $B_L = F$ |
| EXCD x | 0 0 0 1 1 1 $I_2 I_1$ | Same as EXCI x only count down and skip if $B_2 = 0$ |
| LAX x | 0 0 1 0 $I_4 I_3 I_2 I_1$ | Load immediately Acc with $I_4, I_3, I_2, I_1$ (when two or more such instructions follow each other only the first is executed) |
| LDA x | 0 0 0 1 1 0 $I_2 I_1$ | Load Acc with the contents of RAM and modify $B_{m2}$, 1 by exclusive OR with x ($I_2, I_1$) |
| KTA | 0 1 1 0 1 0 1 0 | Load Acc with content of $K_1$-$K_4$ (key input ports) |
| ATBP | 0 0 0 0 0 0 0 1 | Load Bp flip-flop with LSB of Acc (for control of LCD backplate, Bp=1 display, Bp=0 no display) |
| ATR | 0 1 1 0 0 0 0 1 | Load $R_1/R_2$ flip-flop with contents of Acc |
| WR | 0 1 1 0 0 0 1 0 | Load 0 into $W_1$ and shift W register one bit |
| WS | 0 1 1 0 0 0 1 1 | Load 1 into $W_1$ and shift W register one bit |
| ATL | 0 1 0 1 1 0 0 1 | Load L flip-flop with Acc contents (for control of $b_S$ output) |
| ATFC | 0 1 1 0 0 0 0 0 | Load Y flip-flop with Acc contents and turn on/off segment output ports 0.5 sec. on, 0.5 sec. off |

Table V gives the Mnemonic and Opcodes of the arithemetic logic unit and the operation performed thereby.

TABLE V

| MNEMONIC | OPCODE $I_8 I_7 I_6 I_5 I_4 I_3 I_2 I_1$ | OPERATION |
|---|---|---|
| ADD | 0 0 0 0 1 0 0 0 | Add the contents of Acc and RAM and load sum in Acc |
| ADD 11 | 0 0 0 0 1 0 0 1 | Add the contents of Acc, RAM and the C flip-flop and load sum in Acc |
| ADX x | 0 0 1 1 $I_4 I_3 I_2 I_1$ | Add the contents of Acc and x ($I_4, I_3, I_2, I_1$) and ship the next instruction |
| COMA | 0 0 0 0 1 0 1 0 | If a carry occurs complement Acc and load result in Acc |
| DC | 0 0 1 1 1 0 1 0 | Add the contents of Acc and 1010 (decimal 10) and load sum in Acc |
| ROT | 0 1 1 0 1 0 1 1 | Link the contents of Acc and the C flip-flop in series and shift right by one bit |
| RC | 0 1 1 0 0 1 1 0 | Reset C flip-flop |
| SC | 0 1 1 0 0 1 1 1 | Set C flip-flop |

Table VI shows the bit manipulation instructions used in the SM-510 with the mnemonics and opcodes and an explanation for the operation performed.

TABLE VI

| MNEMONIC | OPCODE $I_8, I_7, I_6, I_5, I_4, I_3, I_2, I_1$ | OPERATION |
|---|---|---|
| RM x | 0 0 0 0 0 1 $I_2 I_1$ | Reset one bit of RAM as indicated by X ($I_2, I_1$) |
| SM x | 0 0 0 0 1 1 $I_2 I_1$ | Set one bit of RAM as indicated by x ($I_2, I_1$) the relation between x ($I_2, I_1$) and $M_1$ is the same as RM |

Table VII shows the mnemonics and opcodes for the test instructions for the SM-510 and an explanation of the test operation performed.

TABLE VII

| MNEMONIC | OPCODE $I_8, I_7, I_6, I_5, I_4, I_3, I_2, I_1$ | OPERATION |
|---|---|---|
| TB | 0 1 0 1 0 0 0 1 | Skip to next instruction if B = 1 |
| TC | 0 1 0 1 0 0 1 0 | Skip to next instruction if C flip-flop = 0 |
| TAM | 0 1 0 1 0 0 1 1 | Skip to next instruction if contents of Acc and RAM are equal |
| TMI x | 0 1 0 1 0 1 $I_2 I_1$ | Skip to next instruction if one bit of RAM indicated by x ($I_2, I_1$) is 1. The relation between x ($I_2, I_1$ and M is the same as M. |
| TAO | 0 1 0 1 1 0 1 0 | Skip to next instruction if Acc = 0 |
| TABL | 0 1 0 1 1 0 1 1 | Skip to next instruction if content of Acc and $B_L$ are equal |
| TAL | 0 1 0 1 1 1 1 0 | Skip to next instruction if BA port is 1 |
| TIS | 0 1 0 1 1 0 0 0 | Skip to next instruction if one-second signal (IS) is 1 |
| TFL | 0 1 1 0 1 0 0 0 | Skip to next instruction if divider output $f_1$ (1HZ) is 1 |
| TF4 | 0 1 1 0 1 0 0 1 | Skip to next instruction if divider output $f_4$ (8HZ) is 1 |

Table VIII shows the special instructions with the mnemonics and operating codes for the SM-510 and an explanation of the operation performed.

TABLE VIII

| MNEMONIC | OPCODE $I_8 I_7 I_6 I_5 I_4 I_3 I_2 I_1$ | OPERATION |
|---|---|---|
| SKIP | 0 0 0 0 0 0 0 0 | No operation |
| CEND | 0 1 0 1 1 1 0 1 | Stop the system clock |
| 1 DIV | 0 1 1 0 0 1 0 1 | Reset the contents of the divider (f1-f14) |
| BDC | 0 1 1 0 1 1 0 1 | Enable the LCD if the C flip-flop is 0 and disable the LDC display by cutting the bleader current if the C flip-flop is 1 |

As noted above, when power is initially turned on the ACL terminal goes "high" (GND) and the program counter is initialized to page 31, step 0 ($P_u=3$, $P_M=7$, $P_L=0$) where the initial step of the SM-510 program is loaded. Immediately after ACL circuit operation the initial state of the SM-510 is set up as shown in Table IX. Those registers which need identification of contents must be initialized by the program as required.

TABLE IX

| REGISTER/FLIP-FLOP | INITIAL STATE |
|---|---|
| Program Counter (PC) | Page 31, step 0 |
| $R_1, R_2$ | Reset |
| Bp | Set (LCD display circuit in active state) |
| $Y_1, Y_2$ | Reset (bs in non-flashing state) |
| BC | Reset (LCD bleader current on) |

Table X shows the registers and flip-flops whose status require initialization by the program because these are undefined after ACL circuit operation.

TABLE X

| REGISTER, FLIP-FLOP | INITIALIZATION |
|---|---|
| BM, BL | LBL Instruction execution |
| DIV (f1-f4) | Reset by IDIV Instruction |
| 4 (1 second signal) | Reset by TIS Instruction |
| $S_1$-$S_8$ (strobe) | Reset by program (WR Instruction) |
| Stack Register (S,R) | Initialized by Program (TM or TML Instruction) |
| RAM | Reset by Program |
| $L_1$-$L_4$ ($b_s$ display flip-flop) | Reset by Program |

After a clock halt mode, for decreasing power dissipation, engendered by a CEND instruction, the system is restarted by either IS signal (1 second signal generated by the followind edge of the fi signal of the divider, or by a key input $K_1$-$K_4$). In such a case the program counter starts at page 1, step 0 ($P_u=1$, $P_M=0$, $P_L=0,0$). Table XI shows the registers or flip-flops whose contents remain uncharged during the clock halt mode.

TABLE XI

| REGISTER, FLIP-FLOP | CONTENTS WHEN CLOCK STARTS |
|---|---|
| RAM | Unchanged (UC) |
| $L_1$-$L_4$ ($b_s$ display flip-flop) | UC |
| $R_1, R_2$ | UC |
| Bp | UC |
| $S_1$-$S_8$ | UC |
| Program counter (PC) | $P_u=1$, $P_M=0$, $P_L=0,0$ |

Table XII shows the register or flip-flop whose initialization by program must occur since after clock restart, the condition is undefined.

TABLE XII

| REGISTER, FLIP-FLOP | INITIALIZATION |
| --- | --- |
| $B_M$, $B_L$ | LBL instruction |
| Stack register (S,R) | Program (TM or TML instruction) |

Thru the use of the matrix display described above and as shown in FIGS. 4 and 5 and the multiplexing output of the microcomputer, any of the plurality of different games may be played on the display shown on the watch face 26, which is seen in FIG. 3. The games are controlled, as is described in more detail below, by the microcomputer (microprocessor) contained within the watch housing 22. Control of each game, as will also be discussed in more detail below, is accomplished by the microcomputer in accordance with the game selected by the player, the stored program for that game contained in the microcomputer memory, and input to the microcomputer by the game player, thru any of the Right, Left or Five buttons 30, 32 and 34 contained on the watch housing 22.

Figure 6A:
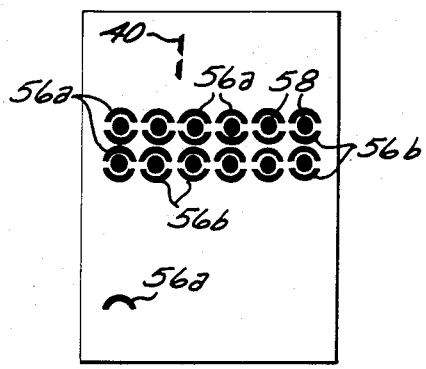
FIGS. 6a-f show a representative sample of the game display and digital display during the play of a first game to illustrate the game display elements and the simulated movement and the interaction during game play be selective illumination of the display elements and illustrating also the player input to the representation appearing on the game display.

The first of several games which the preferred embodiment is capable of performing is denominated "Blastaway". The initial display on the watch face is as shown in FIG. 6a. As is shown both the inner and outer game display element segments 56a and b and 58 of the game display elements 48 in rows 1 and 2 and columns A thru F are illuminated. This gives a field of 24 total targets, including the outer game display element segments 56a and b, which appear as unclosed circles around the inner game display element segments 58, and the inner game display element segments (dots) 58 themselves. Aslo illuminated in row 6 at one of the positions in columns A thru F is an upper game display element segment 56a representative of a paddle, which paddle is controlled by the game player through the use of the "Left" and "Right" buttons 30, 32 on the housing 22 of the wrist watch 20.

The object of the game is to knock down all the circles and dots displayed in the top two rows of the matrix in columns A thru F using the paddle to "bounce" a representation of a ball appearing on the display 26 as an inner game display element segment 58, which appears to move about the matrix by being illuminated at one position then illuminated at one adjacent position as the illumination of the prior position is ceased.

When the game is selected by the game player as described below the single whole digit 40 to the left of the colon 44 is illuminated as the digit 1 to indicate game number one has been selected. During the game this whole digit 40, along with whole digits 36 and 38 to the right of the colon 44 are illuminated to indicate the score, with the maximum socre possibly so indicated being 999. The colon 44 is not illuminated during the playing of the game.

The game is started by depressing one of the Right or Left game play keys 30, 32, with the Left key 32 selecting game play with no sound, and the Right key 30 selecting game play with sound effects. After a preselected time, for example, two seconds, the score, initially 0, appears and the "ball" is served automatically from the bottom row of the matrix, from a random column, A thru F, with some sound effect being generated, and the ball moves diagonally across the matrix in a randomly selected direction, either right or left. For example, the ball appears to move across the LCD game screen 26 formed by the matrix of rows 1-6 and columns A-F by starting in row 6 column D with the inner game display element segment 58 being illuminated and appears to move across the matrix as the inner game display element segment 58 in row 5, column C is illuminated as the inner game display element segment 58 in row 6 column D ceases to be illuminated. Following this the inner game display element segment 58 in row 4 column B is illuminated and the inner game display element segment 58 in row 5 column C ceases to be illuminated. The inner game display element segment 58 in row 3 column A is then illuminated as the inner game display element segment 58 in row 4 column B ceases to be illuminated. Since column A is the furthest to the left on the matrix which the ball can travel to in this game mode, it is "bounced" from the immaginary edge of the matrix adjacent column A and continues its upward movement along an opposite diagonal, so as to reach row 2, column B in its next progressive step of the illumination of game display element inner segment 58 representing movement of the ball across the matrix. However, row 2 column B is occupied by a target consisting of a game display element 48 inner segment 58 and outer segments 56a and 56b.

The speed of movement, i.e., the time which passes between start of illumination of one game display element inner segment 58 and the start of illumination of an adjacent game display element inner segment 58 is equal to or some fraction of the system clock, e.g., 360 msec., 300 msec., 240 msec. or 180 msec.

When the ball strikes, i.e., coincides in position with, such a target, the inner segment 58 of the target game display element 48 disappears, leaving only the target game play element 48 outer segment 56a and b. This simulates an explosion of the target game display element 48, and then game play element 48 outer segments 56a and b disappear and the inner segment 58 without the unclosed circular outer segment 56a and b surrounding the inner segment 58, reappears, i.e., only a dot 58. Having struck a target game display element 48, the ball begins a downward trajectory across the matrix at an angle which depends upon the angle from which the ball struck the target 48 and the column location of the target 48. When the target is hit in a column other than A or F, as in the example being described, where the target is in row 2, column B, the ball begins a downward trajectory at an angle opposite from which it struck the target 48. Thus in the example being described, the next illuminated game play element 48 inner segment 58, representing the ball, would be in column D, row 3, followed by column E, row 4 and column F, row 5.

Figure 6B:
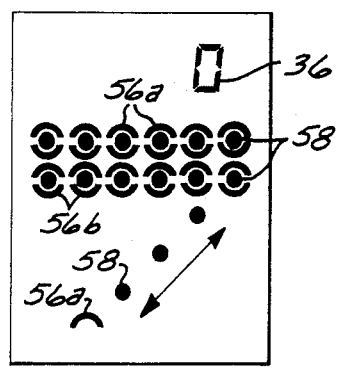
Figure 6C:
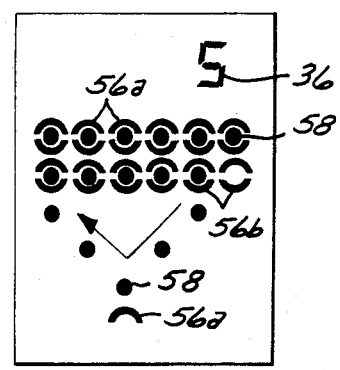

The object for the game player then is to move the game display element upper outer segment 56a in row 6, representing the paddle, to a position to reflect the ball to again commence an upward trajectory, without allowing the ball to reach row 6, in which event the particular serve is over and a new serve occurs. The paddle is moved by depressing the right key 30 or left key 32 to move the paddle, respectively, to the right or left one column for each depression of the respective right key 30 or left key 32. If, as is shown in FIG. 6b, the paddle is positioned in the next progressive matrix location in the indicated ball travel, i.e., in column B, row 6, when the ball has traveled in the downward diagonal shown in FIG. 6b from column E, row 3, through C, row 5, the ball will be indicated to be deflected along the same diagonal in its upward trajectory. A sound effect is generated when the ball and paddle are positioned to upwardly deflect the ball. If the paddle is in a position so that the downward trajectory of the ball represented by the indicated movement due to sequential illumination of the respective game display inner segment 58 across the matrix of the game play elements 48 on the LCD 26, such that the ball reaches a position on the matrix directly above the paddle position on the matrix, the ball will be deflected upwardly along a diagonal opposite from the diagonal of its downward trajectory. For example, as shown in FIG. 6c, the illumination of the game display element 48 inner segment 58, representing the ball moving in a downward trajectory form row 3, column E to row 5, column C, with the paddle located in row 6, column C, coincidentally with the ball reaching row 5, column C, the resulting upward trajectory of the ball will be in a diagonal opposite from the downward trajectory, i.e., to row 4, column B, and thence to row 3 column A, whereupon the illuminated representation of the ball will "bounce" from the immaginary wall adjacent column A as described above.

Figure 6D:
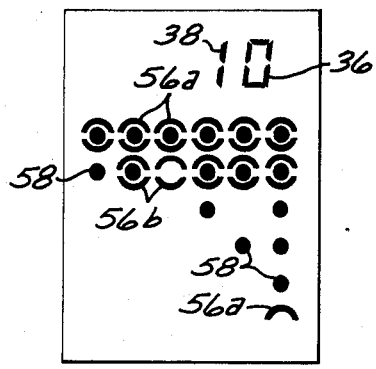
Figure 6E:
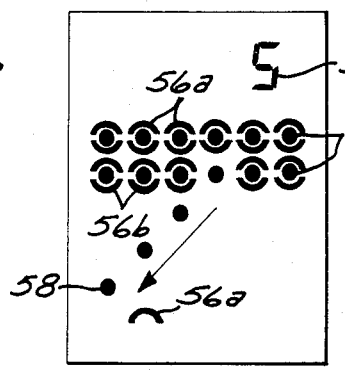

When the paddle is located in column A or column F as shown in FIG. 6d, and the illuminated representation of the game ball enters the matrix location directly above the paddle, i.e., as shown in FIG. 6d, row 5, column F, the resulting upward trajectory of the ball is directly along column F or, had the paddle been in column A along column A. When the ball traveling along its downward diagonal trajectory reaches column A or column F prior to entering row 6, the ball will bounce off the imaginary side wall adjacent column A or F, as described above, except that the direction of movement will continue downwardly. However, assuming that the paddle is, as shown in FIG. 6e, located at a matrix location in row 6 into which the ball would normally be deflected from the imaginary side wall in column A from row 5, i.e., column B, row 6, a miss will be registered by the microcomputer, since the only possible way to deflect the ball upwardly in this situation is with the paddle in column A, or for a diagonal downward trajectory opposite from that shown in FIG. 6e, in column F.

When the ball strikes a target 48 in column A or column F moving in a diagonal upward trajectory, it bounces from the target 48 in a vertical trajectory along column A or column F, respectively, and when it strikes a target 48 in column A or column F moving in a vertical trajectory, it moves in a diagonal downward trajectory toward column A if the target was in column F and toward column F if the target was in column A.

When the ball strikes a target 48 a sound effect is generated and the score is incremented by a selected amount, e.g., 3 points, when the target 48 is in row 2 and is composed of both the display element 48 inner and outer segments 56a and b and 58 and by a larger amount when the target 48 is composed only of the display element 48 inner segment 58, i.e., is a dot on the matrix. The scores are similarly respectively increased for targets in row 1.

When the target 48 is composed only of a dot 58 on the matrix, the ball striking the target, i.e., the trajectory of the ball across the matrix carries it into coincidence with the matrix position of the target dot 58, the dot 58 disappears and the game display outer segments 56a and b appear, simulating an explosion of the dot 58, after which the game display element 48 outer segments 56a and b disappear, leaving no illuminated portion of the game display element 48 at that location in the matrix.

When the ball hits a target 48 in row 2, consisting only of a game display element 48 inner segment 58 the speed of the deflected ball will be increased, e.g., by decreasing the time between successive illuminations of the inner game display segment 58, representing the ball travel across the matrix of the LCD 26, from 360 msec. to 300 msec.

When the ball hits a target 48 in row 1, the ball, upon being deflected downwardly, increases in speed by an increment depending upon whether the target was composed of both the game display element 48 inner and outer segments 56a and b and 58, or simply, the game display element 48 inner dot segment 58, with the speed being incremented to a higher speed in the latter event than in the former. For example, when the target 48 is a full game display element 48 the ball speed is increased, by decreasing the time between illuminations of successive game display inner segments 58, representing the ball travel, from the existing time to 240 msec., and similarly the ball speed is increased when the row 1 target 48 is simply an inner segment 58 by decreasing the illumination time increment to 180 msec.

Figure 6F:
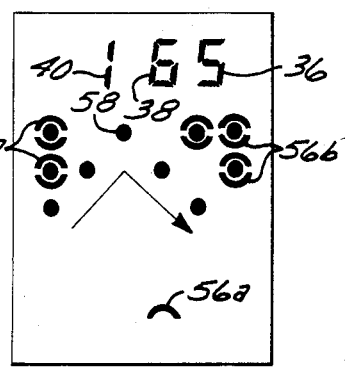

After the ball has struck a circle or dot target it neither effects nor is effected by any other targets in rows 1 and 2 until after it has either been deflected upwardly again by the paddle or it reaches row 1 and is deflected off an imaginary ceiling adjacently above row 1, similarly to the deflection off the imaginary walls adjacent columns A and F. Such a deflection off of the imaginary ceiling, which will still enable the ball to interact with a target 48 on its downward deflection, only occurs when there is no remaining target 48 at the matrix location where the ball reaches row 1. As shown in FIG. 6f, the ball bounces off the ceiling, i.e., from matrix positions 1A or 1F, in a vertical trajectory if the ball reached positions 1A or 1F from a diagonal trajectory, and in a diagonal trajectory if the ball reached position 1A or 1F, along a vertical trajectory, with the diagonal trajectory being towards column A from 1F and towards column F from 1A. If the ball bounces from the ceiling and hits a target 48 position on the matrix, with an illuminated target 48 still remaining in that matrix position in row 2, the target 48 will appear to explode as described above, and the ball will be deflected as described above, except that the trajectory will be upward toward the ceiling, i.e., into row 1. If the ball strikes the same position in row 1 twice in succession without hitting any targets 48, an endless loop has begun and the ball will be shifted one column over and continue downward diagonally.

After all 24 targets, i.e., all game display element 48 inner and outer segments, 58 and 56a and b in rows 1 and 2,have been hit a new field of 24 targets 48 appears and the game will continue, with the speed of the ball incremented upwardly. If the player allows the ball to enter row 6 the serve is over and after a selected number of serves, e.g., 5 the game is over.

A second form of game to be played on the watch face LCD 26 is referred to as "Space Attack", a game in which a third player input button, the Fire button 34 on the watch housing 22, is depressable to simulate, by way of a dot 58 moving across the game display matrix, the firing of a missile by the game player.

Figure 7:
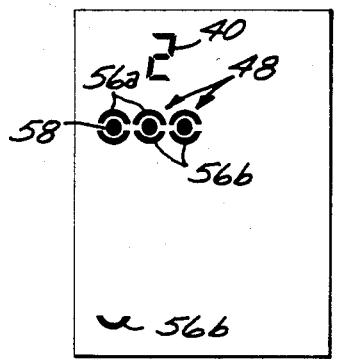
FIG. 7 shows the initial game display set-up for a second game.

The initial display of the "Space Attack" game is shown in FIG. 7. As with the previous game, the game is initiated by pressing the left key 32 to play the game with no sound effects and the right key 30 to start the game with sound effects. The initial display shows a "2" in the first digit 40 to the left of the colon 44, indicating game number 2. After two seconds the score, initially 0, appears and the game is commenced with the starting display on the LCD 26 on the watch face, as shown in FIG. 7. There appear 3 game display elements 48 in row 1 columns A, B and C, each displaying both inner and outer segments 58 and 56a and 6 and a game display element 48 lower outer segment 56 at one of the matrix locations in row 6. Upon the starting of the game by depressing either the right or left key 30, 32, the digit 40 indicates the number of bomb hits from the space invaders which may be sustained by the game player before the game is over. This number is decremented downwardly by one each time the player controlled cursor, formed by the game display element 48 lower outer segment 56 in row 6, is struck by a bomb released by the space invaders. The bomb released by the space invaders is represented by game display element 48 inner segments 58 being sequentially illuminated and appears as a dot moving vertically downward in the column from the point of release by one of the three space invaders initially represented, or however many are left as the course of the game progresses.

The space invaders, three in number, represented by game display elements 48 initially starting in row 1 columns A thru C, move in incremental steps across the columns in row 1 from A to F, when the invaders are moving from left to right across the matrix, e.g., in row 1. When the right most invader 48 reaches column F, the group of invaders moves downwardly one row to, e.g., row 2, and begins movement in an opposite direction across the matrix at a faster speed, with the bombs released also traveling downward at the same increased rate of speed. When one or more invaders has been destroyed, as described below, the movement of the group of invaders remains the same, even though the illumination of one or more invaders in the group has ceased, e.g., in moving toward column F, if the rightmost invader position in the group is no longer illuminated, the invaders change row and direction when the invader in the right most position would have reached column F.

The game player controlled cursor is moved left and right one column at a time as was the paddle in "Blastaway", with the added player input of a fire key 34, which is another buttom 34 positioned on the watch housing 22. When the fire key 34 is enabled and depressed by the player, a missile dot, represented by a game display element 48 inner segment 58, appears in the cursor and begins to move vertically upward from the cursor in the column in which the cursor was positioned at the time of pressing the fire button 34. The fire button 34 is enabled when the "Space Attack" game is in progress and there is no missile currently appearing on the screen formed by the matrix of the LCD 26, and the fire key 34 is pressed after the previous missile had disappeared from the screen of the LCD 26 and also the cursor had been moved by the game player from the column in which it was at the time the last missile was fired.

When the missle strikes a space invader target 48, i.e., coincidentally has the same row and column matrix location as a space invader target 48, the game display element 48 inner segment 58 for the respective invader target 48 disappears, a tone is sounded, the score is incremented by a selected amount, e.g., 12 points, and the respective outer game display segments 56a and b disappear thus simulating a explosion of the space invader at the time the score is also incremented on the digits 36, 38 and 40. When a missle strikes a bomb having been dropped by one of the space invader targets 48, the dot 58 disappears, game display element 48 outer segments 56a and b appear in the form of a circle, a tone is sounded, the score is incemented by, e.g., 9 points, and the game display element 48 outer segments 56a and b then disappear, simulating the explosion of the bomb at the time the score is incremented. This occurs when the downward vertical trajectory of the bomb and upward vertical trajectory of the missle are such that the missle and bomb are incremented into the same matrix location column and row, at the same time, or pass each other between rows in the column, i.e., the missle and bomb are at time-1 each in adjacent rows, such that the time-2 the missle would have normally been incremented into the position of the bomb at the time-1 and the bomb would have normally been incremented at time-2 into the position on the matrix of the missle at time-1. In this latter event, the explosion of the bomb appears to occur in the higher row, i.e., the position of the bomb at time-1.

When a bomb strikes the player controlled cursor, i.e., occupies the same column position in row 6 as the cursor at a given time, the entire game display element 48, consisting of the upper and lower outer segments 56a and b and the inner segment 58 is illuminated at that column in row 6, an alarm is sounded, the space invader targets 48 halt their sideways motion, and the game display element lower segment 56 forming the cursor then disppears, leaving a dot 58 below an upper segment 56a. The dot 58 then disappears, and the remaining number of bomb hits allowable, during the course of the game to the game player, is displayed in the whole digit 40 to the left of the colon 44. After a pause of, e.g., two seconds, if the number of remaining allowable bomb hits is not now 0, the game resumes with the cursor 56 reappearing in row 6 and the remaining invader targets 48 again commencing their sideways movement, from the position they occupied at the time of the bomb hit.

If a player succeeds in shooting down all of the invader targets 48, a new field of invader targets 48 appears, numbering 3 invaders as described above, and the game resumes. If, on the other hand, any of the invader targets reaches row 6, without being destroyed, the game is then over. Also, if the number of allowable bomb hits sustained by the cursor is exceeded, the game is over.

Figure 8:
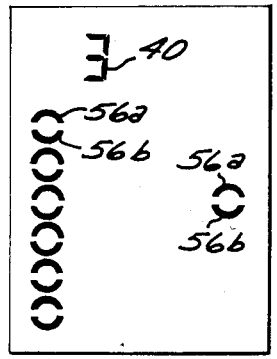
FIG. 8 shows the initial game display for a third game.

An additional game which may be played on the LCD of the face 26 of the watch 20 is termed "Firing Squad". The initial game display for "Firing Squad" is shown in FIG. 8, with the game display element 48 outer segments 56a and b illuminated in column A, and one of the matrix locations in column F having a game display element 48 outer segments 56a and b illuminated. Column A represents the firing squad and the display in column F represents the firing squad victim. The illuminated "3" in the single full dit 40 to the left of the colon 44 indicates game 3.

Once a game start button is depressed, for sound (30) or soundless (32)play, as described above, a randomly selected firing squad member is shown to have a loaded weapon, by the appearance, of an inner game display element segment 58 within the game display element 48 outer segments 56a and b in one of the rows 1-6, and a sound effect, e.g., a click, is generated. The respective firing squad member then fires, with the game display element 48 inner segment 58 in the row of the respective firing squad member illuminating in sequence from column A to F, to step the bullet representation across the respective row to column F, after which it disappears.

The game player, by depressing the right 30 or left 32 control buttons, as described above, can move the victim one row at a time per depression into a row in which no bullet is travelling. If the victim is in the row in column F in which the bullet is traveling at the time the bullet enters row F, the victim disappears and the game is over.

If the victim avoids the first bullet, two randomly selected firing squad members load and fire as before, with the same sound effects. The bullets move in unison, column for column, across the matrix screen 26. There are then two rows which the game player must avoid being in at the time the bullets enter column F. This continues until five of the six firing squad members load and fire bullets, travelling in unison across the matrix screen 26, leaving only one safe row for the victim to be placed by the game player.

Each time one or more firing squad member(s) fires in unison it is termed a salvo. After five salvos with, respectively, one to five bullets, the firing squad members load and fire randomly ("at will") until a total of ten bullets have been fired. If the game player maneuvers the victim to successfully avoid all of the bullets in round one, after the "fire at will" portion, a second round is begun. The second round is identical to the first, with the exception that the firing squad reloads when the bullet(s) appear in row F. Third, fourth and fifth rounds occur in succession, so long as the victim succeeds in avoiding all fired bullets, with the firing squad reloading as the bullets fired reach, respectively, columns E, D and C.

At the close of five full rounds, the firing squad members march off the matrix screen of the LCD 26 by removing the illumination of the game display element 48 outer segments 56a and b in rows 1 thru 6 in column A in sequence, with a sound, effect, e.g., a tone as each disappears.

The firing squad members then reappear by illuminating the game display element 48 outer segments 56a and b in rows 1 thru 6 in column A in sequence, with a sound effect, e.g., a tone as each is illuminated. Firing then recommences, with the speed of the bullets moving across the matrix screen of the LCD 26, increased. Thus, e.g., in round one the speed of movement of the bullets, i.e., the time between illumination of game display element 48 inner segments 58 in adjacent columns in a row in which a bullet is travelling, is 360 msec, which in round 2 is decreased to 300 msec, in round 3 is decreased to 240 msec. and so on, giving the appearance of faster bullet travel across the matrix screen of the LCD 26. Each time a round commences, the firing squad also similarly increases the speed at which it marches back onto the screen.

Points are scored for each bullet which enters column F without striking the victim and thus appears to leave the matrix screen 26 through column F.

A fourth game which may be displayed on the watch face matrix screen is "Alien Intercept". In this game the game player attempts to fire interceptors to intercept one or more targets moving across the matrix screen 26 from column A to F or vice-versa, in any of the top three rows and at varying speeds. Points are awarded, according to target speed, for such an intercept, i.e., causing coincidence of the interceptor fired and the target in a column and row.

Figure 9:
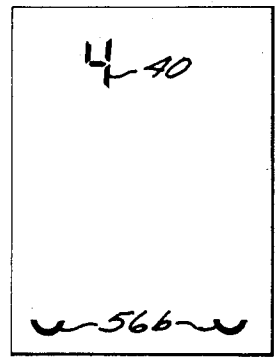
FIGS. 9 and 9a show, respectively, the initial game display for a fourth game and the simulation of a target explosion employed in the course of the fourth game.

The initial game display for "Alien Intercept" is shown in FIG. 9, with a cursor display, as in "Space Attack" described above, except that two cursors formed by game display element lower outer segments 56b are illuminated, in columns A and F, and are not subsequently movable in row 6 by the game player. Instead, the right and left keys 30, 32, when depressed, cause the firing of an interceptor from the respective right or left cursor, i.e., in column F or column A.

As with the other games noted above, "Alien Intercept" may be played with or without sound effects, by depressing, respectively, the Right key button 30 or Left key button 32 to commence the game. Once the game is commenced targets consisting of game display element 48 outer segments 56a and b will appear in either of Columns A or F and one of the first three rows, at random, and will move across the matrix screen of the LCD 26 at a randomly selected speed, e.g., 360, 240 and 180 msec between illumination of the outer segments 56a and b of adjacent game display elements 48.

When the Right button 30 is depressed, there will appear in the cursor 56b in column F, row 6 a game display element 48 inner segment 58 representing an interceptor which will appear to move diagonally across the matrix screen of the LCD, i.e., to row 5, column E, row 4 column D and so on. Depressing the Left button 32 will cause an interceptor to be similarly fired from the left cursor in row 4, column 4 and move across the matrix screen to row 1, column F.

Figure 9A:
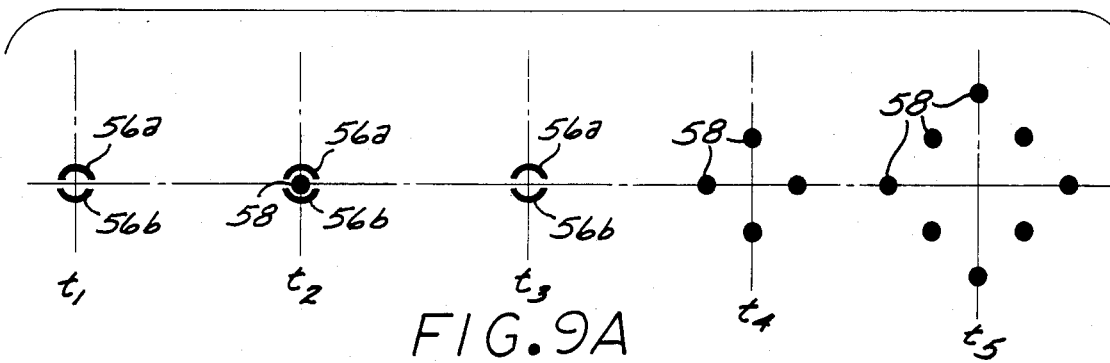

When an intercept occurs, as shown in FIG. 9a, the interceptor and target first appear to occupy the same matrix position, column and row, at the same time. The inner segment 58 representing the interceptor then disappears; then the outer segments representing the target disappear. There then appears a simulation of an explosion accompanied by some sound effect. The simulated explosion is represented by game display element inner segments 58 horizontally and vertically immediately adjacent the matrix location of the intercept being illuminated in a diamong pattern about the intercept location, followed by the illumination of a larger diamond pattern, as is shown in FIG. 9a. The score is incremented upwardly by a selected amount, e.g., 3 points, with the point value depending on target speed, i.e., higher speed gives a higher point value.

If no intercept occurs, both the interceptor and target move off of the matrix screen of the LCD 26 after reaching the opposite column from their starting column.

Only one target and interceptor can appear on the matrix screen 26 at any one time, so that the game player gets only one shot with an interceptor per target.

Figure 10:
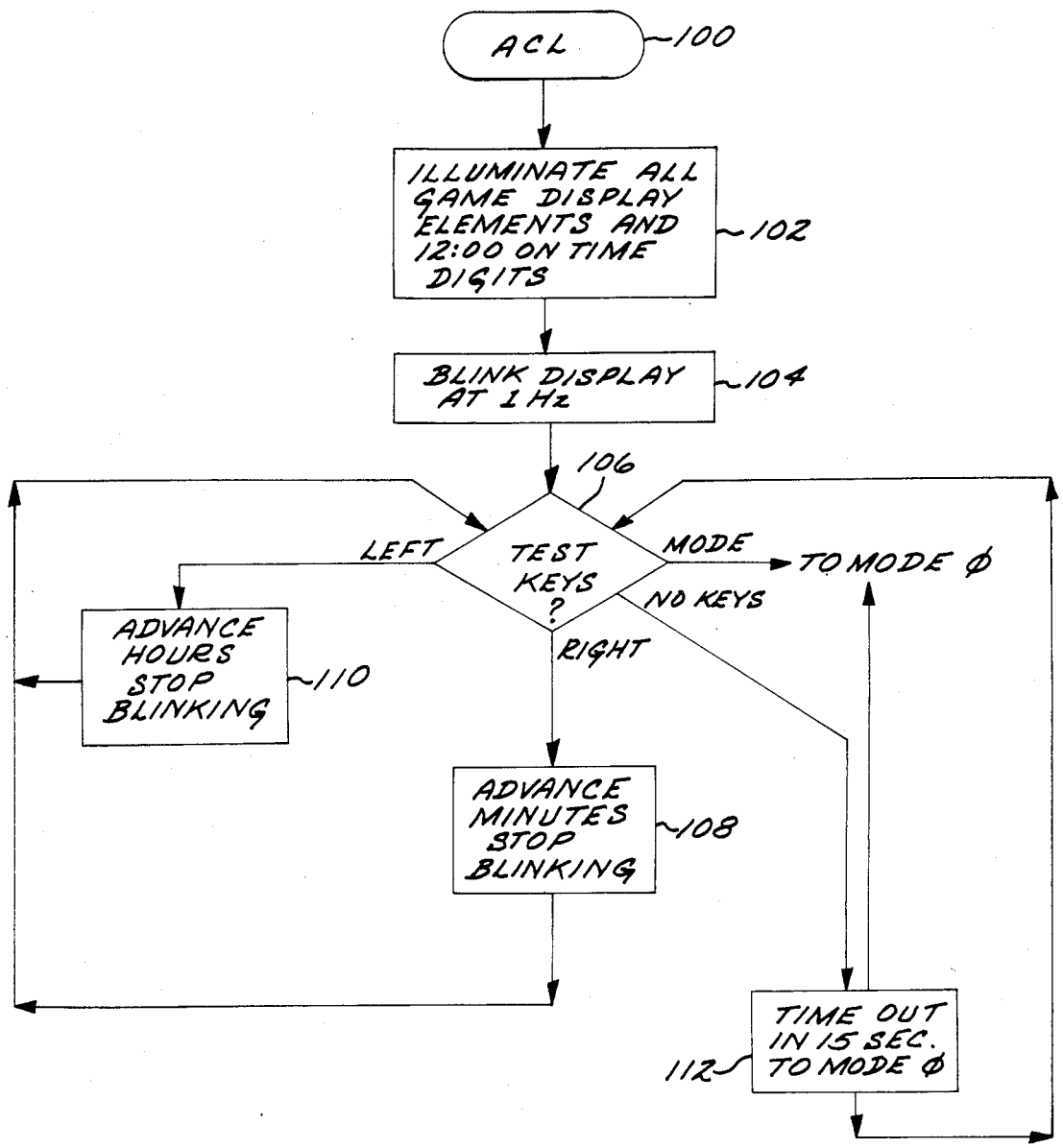
FIG. 10 is a program flow chart for a portion of the program of the microcomputer of the game watch of the present invention.

FIG. 10 illustrates the program for the watch 20 when power is initially turned on, or after the reset button 34 is depressed, which as described above, activates the ACL circuit to initialize the program counter of the SM-510 to page 37, step 0. This is indicated by block 100. The program loads the display RAM to display all game display elements 48 and the three and one half digits and the colon 36, 38, 40, 42 and 44 to display "12:00", as shown in block 102. The bs, output is enabled to cause the entire display on LCD 26 to blink at 1 Hz as shown in block 104. Diamond 106 illustrates the testing of the contents of the K register for an indication of the depression by the wearer of the watch 20 of any of the input key buttons, mode select 28, Right 30, or Left 32 (input from the Fire key button 34 is only enabled during game play, as discussed above). If the mode select button 28 has been depressed, the program goes to Mode 0, as discussed below. If the Right key 30 is depressed, the minutes indicated in digits 36 and 38 are advanced incrementally, until the depression of the Right key is released by the wearer, and the blinking of the display on the LCD 26 is stopped. This is shown in block 108. Similarly the Left key 32 increments the one digit 40 and the one half digit 42, to set the hours indicated on the LCD display 26, and the display ceases blinking, as shown in block 110. If no keys have been depressed as indicated in block 112, the program counts fifteen seconds, and if no keys have been depressed within that time, automatically goes to Mode 0.

Figure 11:
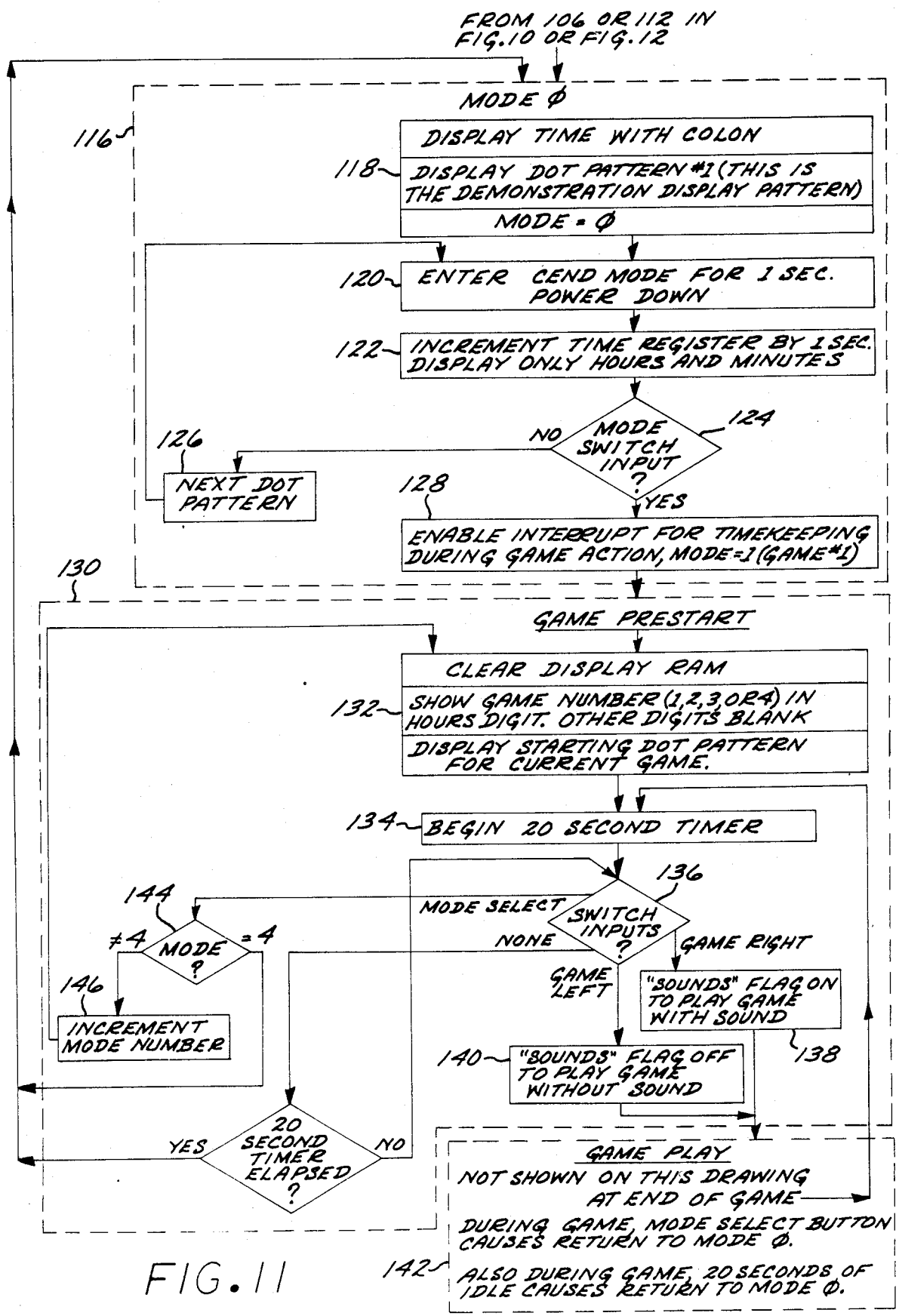
FIG. 11 is a program flow chart for another portion of the program of the microcomputer of the game display watch of the present invention.

FIG. 11 illustrates Mode 0 and game selection through the Mode selection input button 28. When the program enters Mode 0, contained with dotted lines 116 in FIG. 11, as shown in block 118, time is displayed on the three and one-half digits 36, 38, 40 and 42 with the colon 44 also displayed. A demonstration dot pattern of game display elements 48 or portions thereof is displayed on the LCD 26. The program then executes a CEND instruction, block 120, to reeduce power dissipation for 1 sec, after which the time register is incremented by 1 sec, block 122. Only hours and minutes, however, are displayed, of course.

The program then tests for input from the Mode select switch 28 is diamond 123. If the mode select switch 28 has not been depressed by the wearer of the watch, the demonstration pattern in incremented by one in block 126 and the program returns to block 120 and executes a CEND instruction as above described. The demonstration dot patterns are stored in memory and loaded into the display RAM, and may be, e.g., illustrations of sequential steps of game play action, e.g., a ball moving across the display LCD 26 to strike a target 48.

If the mode select switch 28 has been depressed by the wearer of the watch 20, the program advances to block 128 where mode is set to 1 and the time display is disabled. The program then advances into games prestart as shown in FIG. 11 within the dotted lines 130. As shown in block 132 the display RAM is cleared, the game number for the current game in games prestart (initially game 1) is shown in the hour digit 40, with the other digits blank, and the initial game display described above for the current game in games prestart (initially game 1) is displayed on the LCD 26. The program then starts a 20 second timer in block 134.

The program then tests in diamond 136 for input from the mode select switch 28 and the Right and Left switches 30, 32. If the Right switch 30 is depressed within the twenty seconds elapsed on the timer, the current game is selected, as shown in block 138, with sound effects. If the Left switch 32 is depressed the current game is selected without sound effects, as shown in block 140. The program for the selected game then commences as shown within the dotted lines 142. The program for game play of the various games is discussed below. As noted within dotted lines 142, at any time during game play the depression of the mode select switch 28 returns the program to Mode 0. Also, after twenty continuous seconds of elapsed idle time during game play, the program returns to Mode 0. Also, as shown within dotted lines 142, at the end of the game program for the game in question, the program returns to block 134 setting the twenty second timer and allowing selection of another game if desired.

If the wearer of the watch 20 does not want to play the displayed game during game prestart (initially game 1), depression of the mode select switch 28 causes the program to check the mode number, and if less than 4, increment the mode number by 1 and return to block 132 where the next sequential game number will be shown in diamond 144 and block 146.

If the mode number has already been incremented through modes 1-4, as shown in diamond 144, the program returns to Mode 0.

The program for the game play of each of the above described games is shown in the attached appendix to the application which includes the game play program in machine language for the SM-510 embodiment described above, which implements the present invention.

SUMMARY OF THE ADVANTAGES AND SCOPE OF THE INVENTION

It will be appreciated that in constructing a digital watch according to present invention, certain significant advantages are obtained. In particular a wristwatch having a game display LCD wherein the LCD has a matrix game display capable of displaying a plurality of games. Illumination of plurality of game display elements on the matrix is controlled by a stored program in the LSI chip within the watch housing, which program enables player input from a plurality watch housing switches in response to the representation on the matrix of the game display LCD, in order to create interaction between the game program controlled representations on the display LCD and the player controlled representations on the matrix of the game display LCD.

The foregoing description of the invention has been directed to a particular preferred embodiment in accordance with the requirements of the patent statutes and for purposes of explanation and illustration. It will be apparent, however, to those of ordinary skill in the art that many modifications and changes can be made without departing from the scope and spirit of the invention. For example, the Sharp SM-510 is one of many microcomputer/microprocessor LSI chips which can be suitably programmed to carry out the present invention. In addition, the LCD display could be replaced by other suitable low power dissipation displays, e.g., certain types of electrochromatic or electrophoeretic displays. Further, the particular games discussed above, are illustrative only of the type of game which the microcomputer can be programmed to display on the matrix game display of the LCD. Other possible games can be programmed, providing for selective illumination of the game display elements according to a stored program and player input during the game, e.g., a game similar to the well known "Pong" type of game simulating a single player or two player racquet type sport, or a sheet shoot game similar to "Alien Intercept" wherein the targets progress across the LCD display matrix in a curving trajectory.

It will further be apparent that the invention may be utilized with other suitable modifications within the skill of the art. These other modifications will be apparent to those skilled in the art and it is the applicants' intention in the following claims to cover all such equivalent modifications and variations as fall within the tone, spirit and scope of the invention.

What is claimed is:

1. A wristwatch having a game face, comprising:
   a matrix display on the face, having a plurality of display elements for indicating the status of the game at any given time by illumination of the display elements;
   means for player control of the position on the matrix display of at least one player controlled display element during the course of the play of a game;
   means for sequentially illuminating selective display elements at adjacent matrix locations to visually impart stepwise movement of game display elements about the matrix in response to a programmed set of instructions stored in memory;
   means for sequentially illuminating selective display elements to visually impart stepwise movement of game display elements about the matrix in response to player control input and a programmed set of instructions stored in a memory;
   means for changing the state of illumination of selected game display elements in response to coincidence on the matrix of at least one player controlled display element and one of the game controlled display elements;
   means for changing the state of illumination of selected game display elements in response to coincidence on the matrix of two game controlled display elements;
   the matrix display having the plurality of display elements arranged in rows and columns with each display element having at least two separately displayed segments, an inner arcuate segment and an outer arcuate segment, said inner and outer segments lying substantially on a circle;
   the display elements of at least one of the plurality of rows or at least one of the plurality of columns comprising three separately displayed segments, including an inner dot segment, a second upper arcuate outer segment and a second lower arcuate outer segment, said second upper and second lower segments lying substantially on a circle about said dot segment; and
   means for sound generation in conjunction with the occurrence of selected game play events.

* * * * *